US012566818B2

(12) United States Patent
Zhu et al.

(10) Patent No.: US 12,566,818 B2
(45) Date of Patent: Mar. 3, 2026

(54) CROWDSOURCING TO FILTER OUT UNPOPULAR POTENTIAL CANDIDATE ANSWERS

(71) Applicant: International Business Machines Corporation, Armonk, NY (US)

(72) Inventors: Huaiyu Zhu, Fremont, CA (US); Yunyao Li, San Jose, CA (US); Youxuan Jiang, Ypsilanti, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1119 days.

(21) Appl. No.: 17/118,700

(22) Filed: Dec. 11, 2020

(65) Prior Publication Data

US 2022/0188575 A1 Jun. 16, 2022

(51) Int. Cl.
| | |
|---|---|
| *G06F 18/214* | (2023.01) |
| *G06F 18/2113* | (2023.01) |
| *G06F 40/205* | (2020.01) |
| *G06F 40/30* | (2020.01) |
| *G06N 20/00* | (2019.01) |

(52) U.S. Cl.
CPC ...... *G06F 18/2155* (2023.01); *G06F 18/2113* (2023.01); *G06F 40/205* (2020.01); *G06F 40/30* (2020.01); *G06N 20/00* (2019.01)

(58) Field of Classification Search
CPC ............................ G06F 16/3329; G06N 20/00
See application file for complete search history.

(56) References Cited

U.S. PATENT DOCUMENTS

| | | | |
|---|---|---|---|
| 8,527,262 B2 | 9/2013 | Kambhatla | |
| 8,732,662 B1 * | 5/2014 | Savant | G06F 9/451 |
| | | | 717/121 |
| 8,819,007 B2 | 8/2014 | Brown | |
| 9,317,586 B2 | 4/2016 | Chu-Carroll | |
| 9,384,450 B1 * | 7/2016 | Cordes | G06N 20/00 |
| 9,672,201 B1 | 6/2017 | Uszkoreit | |
| 10,198,505 B2 | 2/2019 | Frank | |

(Continued)

FOREIGN PATENT DOCUMENTS

| | | | |
|---|---|---|---|
| WO | 20151913681 A1 | 12/2015 | |

OTHER PUBLICATIONS

Molino et al. (Playing with knowledge: A virtual player for "Who Wants to Be a Millionaire?" that leverages question answering techniques; Artificial Intelligence vol. 222, May 2015, pp. 157-181). (Year: 2015).*

(Continued)

*Primary Examiner* — Tan H Tran
(74) *Attorney, Agent, or Firm* — Amin, Turocy & Watson, LLP

(57) ABSTRACT

Technology for selecting a correct answer (for example, a correct label for a data set to be used in machine learning algorithms) from among a plurality of candidate answers, where the answers selected relatively infrequently by a plurality of human evaluators are cold from the full plurality of candidate answers to obtain a reduced subset of candidate answers. In this way, further selection of the correct answer (for example, ultimate selection of the correct answer by a human expert) will only need to consider the reduced subset, thereby potentially saving time and effort in the selection of the correct answer.

8 Claims, 5 Drawing Sheets

250

(56) References Cited

U.S. PATENT DOCUMENTS

| | | | |
|---|---|---|---|
| 2017/0075918 A1 | 3/2017 | Bates-Haus | |
| 2019/0370333 A1* | 12/2019 | Akbik | G06F 40/30 |
| 2021/0263974 A1* | 8/2021 | Li | G06N 3/049 |
| 2021/0407680 A1* | 12/2021 | Patil | G16H 40/67 |
| 2022/0092911 A1* | 3/2022 | Katz | G07F 17/329 |

OTHER PUBLICATIONS

Acatutor (Essential Standardized Test Skill for YoungStudents: Always Use POE!; published Jul. 2, 2019, pp. 1-3). (Year: 2019).*

Brewer (Youtube: Cisco Webex How to Poll in Webex Meetings, video duration of 15:11, https://www.youtube.com/watch?v=WLpLBHeLkSI&t=480s, published Jul. 4, 2020). (Year: 2020).*

"A self-diagnosing question answering system", An IP.com Prior Art Database Technical Disclosure, Authors et. al.: Disclosed Anonymously, IP.com No. IPCOM000247244D, IP.com Electronic Publication Date: Aug. 17, 2016, 6 pages.

"Method and System for Automatically Generating Large-Scale Question Answering (QA) Dataset by Reusing Existing Natural Language Annotations", An IP.com Prior Art Database Technical Disclosure, Authors et. al.: Disclosed Anonymously, IP.com No. IPCOM000256831D, IP.com Electronic Publication Date: Jan. 3, 2019, 5 pages.

Abad et al., "Self-Crowdsourcing Training for Relation Extraction", Proceedings of the 55th Annual Meeting of the Association for Computational Linguistics (Short Papers), pp. 518-523, Vancouver, Canada, Jul. 30-Aug. 4, 2017, Copyright 2017 Association for Computational Linguistics, https://doi.org/10.18653/v1/P17-2082.

Ashikawa et al., "Quality improvement by worker filtering and development in crowdsourcing", Journal of Web Intelligence, vol. 14, No. 3, pp. 229-244, 2016, Published Aug. 4, 2016, 1 page abstract, DOI: 10.3233/WEB-160341.

Chang et al., "Scaling Semantic Frame Annotation", Proceedings of Law IX—The 9th Linguistic Annotation Workshop, pp. 1-10, Denver, Colorado, Jun. 5, 2015, Copyright 2015 Association for Computational Linguistics.

Drapeau et al., "Microtalk: Using Argumentation To Improve Crowdsourcing Accuracy", 2016, 10 pages.

Dumitrache et al., "A Crowdsourced Frame Disambiguation Corpus with Ambiguity", Proceedings of NAACL-HLT 2019, pp. 2164-2170, Minneapolis, Minnesota, Jun. 2-Jun. 7, 2019, Copyright 2019 Association for Computational Linguistics.

Dumitrache et al., "Achieving Expert-Level Annotation Quality With Crowdtruth", 2017, 13 pages.

Dumitrache et al., "Capturing Ambiguity in Crowdsourcing Frame Disambiguation", arXiv:1805.00270v1 [cs.CL] May 1, 2018, 9 pages.

Feizabadi et al., "Crowdsourcing Annotation of Non-Local Semantic Roles", Proceedings of the 14th Conference of the European Chapter of the Association for Computational Linguistics, pp. 226-230, Gothenburg, Sweden, Apr. 26-30, 2014, Copyright 2014 Association for Computational Linguistics.

Fitzgerald et al., "Large-Scale QA-SRL Parsing", Proceedings of the 56th Annual Meeting of the Association for Computational Linguistics (Long Papers), pp. 2051-2060, Melbourne, Australia, Jul. 15-20, 2018, Copyright 2018 Association for Computational Linguistics.

Fossati et al., "Outsourcing FrameNet to the Crowd", Proceedings of the 51st Annual Meeting of the Association for Computational Linguistics, pp. 742-747, Sofia, Bulgaria, Aug. 4-9, 2013, Copyright 2013 Association for Computational Linguistics.

He, et al., "Question-Answer Driven Semantic Role Labeling: Using Natural Language To Annotate Natural Language", Proceedings of the 2015 Conference on Empirical Methods in Natural Language Processing, pp. 643-653, Lisbon, Portugal, Sep. 17-21, 2015, Copyright 2015 Association for Computational Linguistics.

Hong et al., "How Good is the Crowd at "real" WSD?", Proceedings of the Fifth Law Workshop (Law V), pp. 30-37, Portland, Oregon, Jun. 23-24, 2011, Copyright 2011 Association for Computational Linguistics.

Hsuch et al., "Data Quality From Crowdsourcing: a Study of Annotation Selection Creation", Proceedings of the NAACL HLT Workshop on Active Learning for Natural Language Processing, pp. 27-35, Boulder, Colorado, Jun. 2009, 9 pages.

IBM, "A System & Method to Identify Correct Candidates for Question Answering over Structured Knowledge", An IP.com Prior Art Database Technical Disclosure, Original Publication Date: Mar. 16, 2009, IP.com No. IPCOM000180748D, IP.com Electronic Publication Date: Mar. 16, 2009, 4 pages.

Jurgens, David, "Embracing Ambiguity: A Comparison of Annotation Methodologies for Crowdsourcing Word Sense Labels", Proceedings of NAACL-HLT 2013, pp. 556-562, Atlanta, Georgia, Jun. 9-14, 2013, Copyright 2013 Association for Computational Linguistics.

Kapelner et al., "New Insights from Coarse Word Sense Disambiguation in the Crowd", Proceedings of COLING 2012: Posters, pp. 539-548, COLING 2012, Mumbai, Dec. 2012.

Li et al., "Cheaper and Better: Selecting GoodWorkers for Crowdsourcing", arXiv:1502.00725v1 [stat.ML] Feb. 3, 2015, 16 pages.

Liu et al., "Effective Crowd Annotation for Relation Extraction", Proceedings of NAACL-HLT 2016, pp. 897-906, San Diego, California, Jun. 12-17, 2016, Copyright 2016 Association for Computational Linguistics.

Oppenheimer et al., "Instructional manipulation checks: Detecting satisficing to increase statistical power", ScienceDirect, Journal of Experimental Social Psychology, 45 (2009) 867-872, doi:10.1016/j.jesp.2009.03.009.

Palmer et al., "The Proposition Bank: An Annotated Corpus of Semantic Roles", Submission: Accepted for publication: Jul. 11, 2004, Computational Linguistics, vol. 31, No. 1, 36 pages.

Pavlick et al., "FrameNet+: Fast Paraphrastic Tripling of FrameNet", Proceedings of the 53rd Annual Meeting of the Association for Computational Linguistics and the 7th International Joint Conference on Natural Language Processing (Short Papers), pp. 408-413, Beijing, China, Jul. 26-31, 2015, Copyright 2015 Association for Computational Linguistics.

Rajpurkar et al., "SQuAD: 100,000+ Questions for Machine Comprehension of Text", Proceedings of the 2016 Conference on Empirical Methods in Natural Language Processing, pp. 2383-2392, Austin, Texas, Nov. 1-5, 2016, Copyright 2016 Association for Computational Linguistics.

Roit et al., "Controlled Crowdsourcing for High-Quality QA-SRL Annotation", arXiv:1911.03243v2 [cs.CL] May 13, 2020, 6 pages.

Rumshisky, Anna, "Crowdsourcing Word Sense Definition", Proceedings of the Fifth Law Workshop (Law V), pp. 74-81, Portland, Oregon, Jun. 23-24, 2011, Copyright 2011 Association for Computational Linguistics.

Socher et al., "Recursive Deep Models for Semantic Compositionality Over a Sentiment Treebank", Proceedings of the 2013 Conference on Empirical Methods in Natural Language Processing, pp. 1631-1642, Seattle, Washington, USA, Oct. 18-21, 2013, Copyright 2013 Association for Computational Linguistics.

Venhuizen et al., "Gamification for Word Sense Labeling", In Proceedings of the 10th International Conference on Computational Semantics (IWCS 2013), 6 pages.

Wang et al., "Crowd-In-The-Loop: A Hybrid Approach for Annotating Semantic Roles", Proceedings of the 2017 Conference on Empirical Methods in Natural Language Processing, pp. 1913-1922, Copenhagen, Denmark, Sep. 7-11, 2017, 10 pages.

Zhang et al., "Big Data versus the Crowd: Looking for Relationships in All the Right Places", Proceedings of the 50th Annual Meeting of the Association for Computational Linguistics, pp. 825-834, Jeju, Republic of Korea, Jul. 8-14, 2012, Copyright 2012 Association for Computational Linguistics.

* cited by examiner

250

400

RECEIVE PLAN CORPUS — S502

APPLY SEMANTIC ROLE LABELING — S504

OBTAIN CORPUS WITH PREDICTED ANNOTATION — S506

GENERATE TASKS — S508

STORE LIST OF CROWD-SUITABLE TASKS WITH ORIGINAL OPTIONS — S510

FILTER OUT INCORRECT OPTIONS — S512

STORE LIST OF TASKS WITH FILTERED OPTIONS — S514

SELECT CORRECT OPTION — S516

GENERATE AND STORE LIST OF EXPERT-REQUIRED TASKS WITH ORIGINAL AND FILTERED OPTIONS — S518

CROWDSOURCING TO FILTER OUT UNPOPULAR POTENTIAL CANDIDATE ANSWERS

BACKGROUND

The present invention relates generally to the field of crowdsourcing to select a correct answer from among multiple potential candidate answers, and also to the field of using a human expert to select an optimal answer.

Semantic role labeling (SRL) is the task of annotating predicates and their arguments in sentences using semantic frames and their roles. It is an important foundation for many NLP (natural language parsing) tasks, such as question answering, machine translation, and information extraction.

The Wikipedia entry for "labeled data" (as of 6 Jul. 2020) states, in part, as follows: "Labeled data is a group of samples that have been tagged with one or more labels. Labeling typically takes a set of unlabeled data and augments each piece of that unlabeled data with meaningful tags that are informative. For example, labels might indicate whether a photo contains a horse or a cow, which words were uttered in an audio recording, what type of action is being performed in a video, what the topic of a news article is, what the overall sentiment of a tweet is, whether the dot in an x-ray is a tumor, etc. Labels can be obtained by asking humans to make judgments about a given piece of unlabeled data (e.g., 'Does this photo contain a horse or a cow?'), and are significantly more expensive to obtain than the raw unlabeled data. After obtaining a labeled dataset, machine learning models can be applied to the data so that new unlabeled data can be presented to the model and a likely label can be guessed or predicted for that piece of unlabeled data." (footnotes omitted)

SUMMARY

According to an aspect of the present invention, there is a method, computer program product and/or system, for selecting among a plurality of candidate answers by a plurality of human nonexpert annotators and at least one expert annotator, that performs the following operations (not necessarily in the following order): (i) filtering out one or more rejected candidate answers from the plurality of candidate answers based upon the one or more rejected candidate answers being chosen relatively infrequently as a correct answer by the plurality of human nonexpert annotators to obtain a reduced subset of candidate answers; and (ii) selecting, from the reduced subset of candidate answers, an optimal answer based upon responses received from at least one of the following: the plurality of human nonexpert annotators and the at least one human expert annotator.

According to a further aspect of the present invention, there is a method, computer program product and/or system that performs the following operations (not necessarily in the following order): (i) receiving a training data set designed for use in a machine learning computer system; (ii) receiving a plurality of candidate labels for the training data set; (iii) receiving, respectively from a plurality of human individual(s), a plurality of responses with each response including information indicative of one, or more, candidate label(s) of the plurality of candidate labels that a human individual providing the response considers to be most appropriate to describe content of the training data set; (iv) determining, by machine logic, a rejected subset of rejected candidate label(s), the rejected subset including at least one candidate label of the plurality of candidate labels, with the determination being based upon each rejected candidate label being chosen in the plurality of responses with a frequency below a threshold frequency; and (v) determining, by machine logic, an accepted subset of accepted candidate label(s), the accepted subset including at least one candidate label of the plurality of candidate labels, with the determination being made by taking as accepted candidate label(s) all of the potential candidate labels that are not rejected candidate labels.

According to a further aspect of the present invention, there is a method, computer program product and/or system that performs the following operations (not necessarily in the following order): (i) receiving a training data set designed for use in a machine learning computer system, with the training data set including a first label; (ii) receiving a plurality of candidate labels for the training data set, with one candidate label of the plurality of candidate labels being the first data set; (iii) receiving, respectively from a plurality of human individual(s), a plurality of responses with each response including information indicative of one, or more, candidate label(s) of the plurality of candidate labels that a human individual providing the response considers to be most appropriate to describe content of the training data set; (iv) determining, by machine logic, that the first label was chosen in the plurality of responses with a frequency below a threshold frequency; (v) responsive to the determination that the first label was chosen with a frequency below the threshold frequency, selecting a second label of the plurality of candidate labels as being most appropriate to describe the content of the training data set; and (vi) replacing, in the training data set, the first label with the second label.

DETAILED DESCRIPTION

Figure 1:
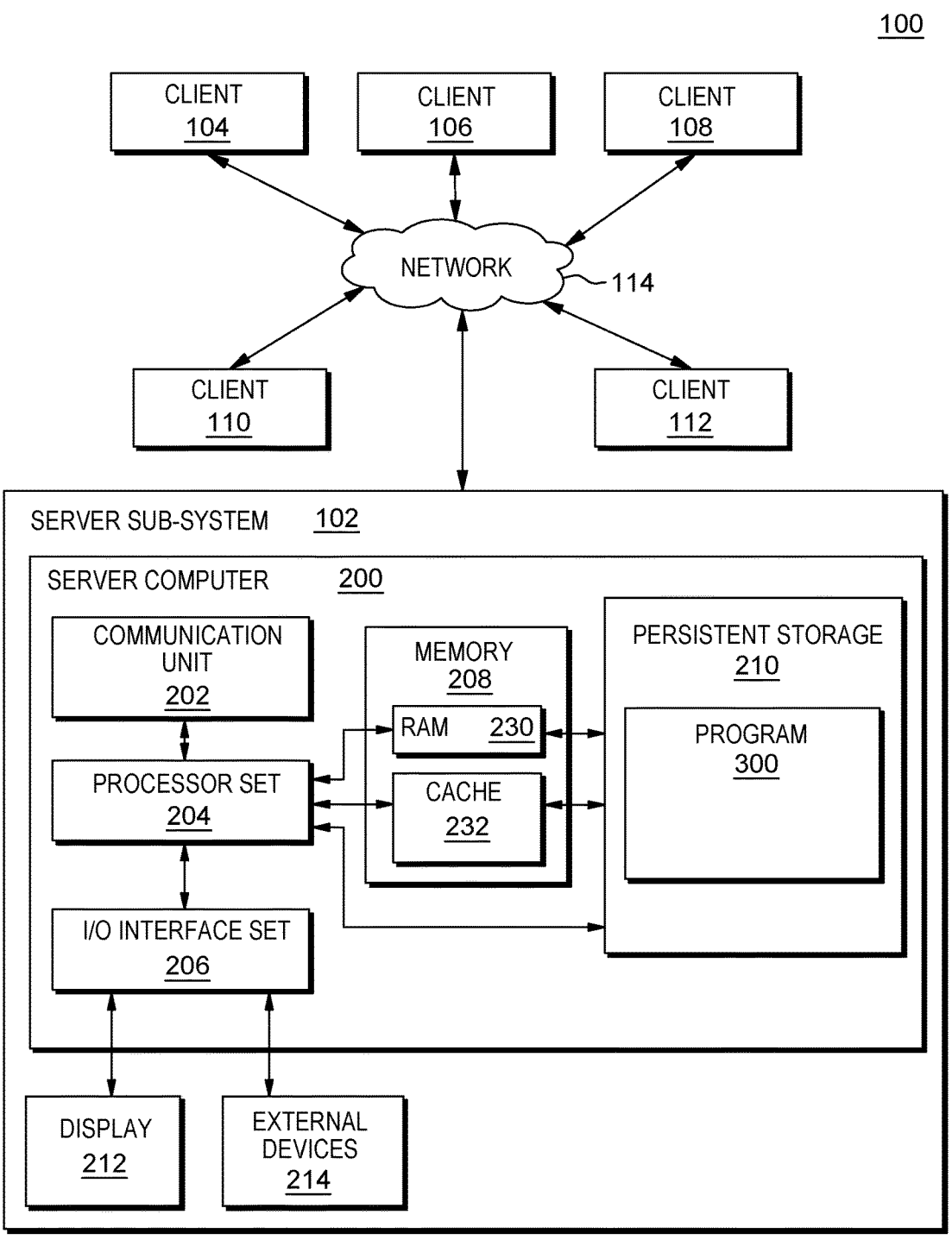
FIG. 1 is a block diagram of a first embodiment of a system according to the present invention.

Some embodiments of the present invention may be directed to technology for selecting a correct answer (for example, a correct label for a data set to be used in machine learning algorithms) from among a plurality of candidate answers, where the answers selected relatively infrequently by a plurality of human evaluators are cold from the full plurality of candidate answers to obtain a reduced subset of candidate answers. In this way, further selection of the correct answer (for example, ultimate selection of the correct answer by a human expert) will only need to consider the reduced subset, thereby potentially saving time and effort in the selection of the correct answer. This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
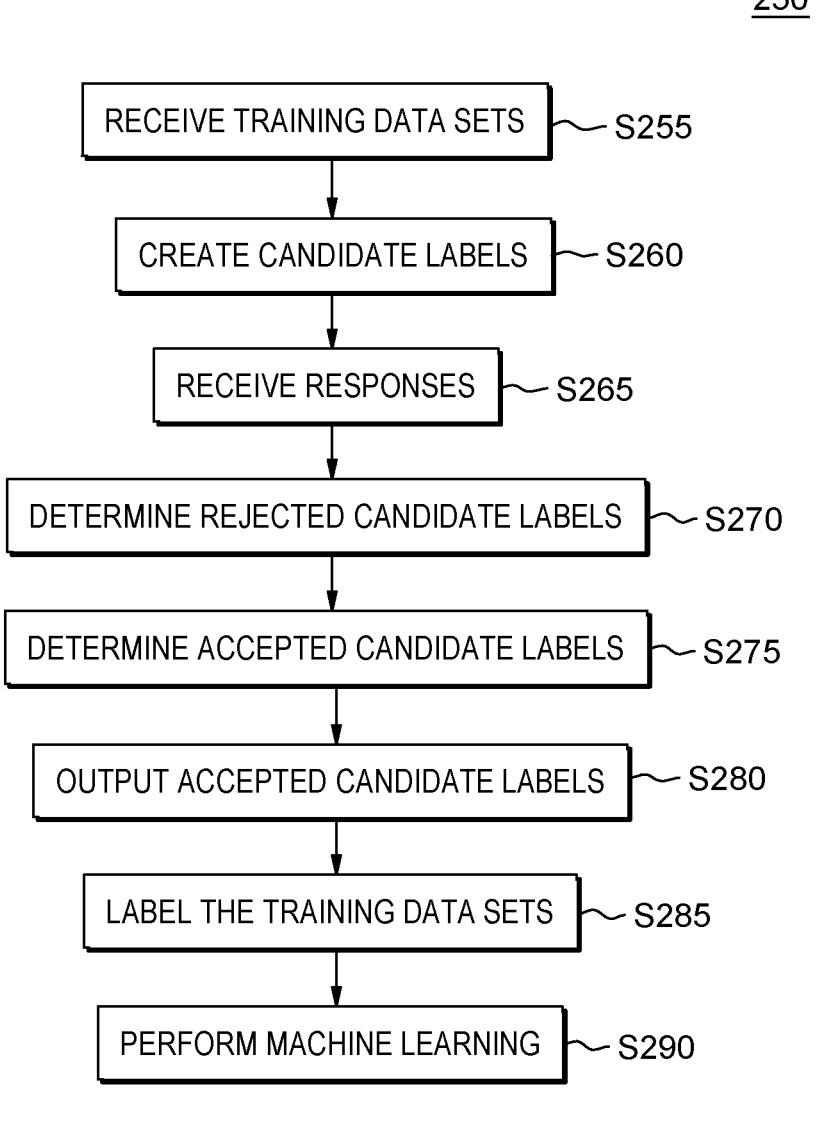
FIG. 2 is a flowchart showing a first embodiment method performed, at least in part, by the first embodiment system.
Figure 3:
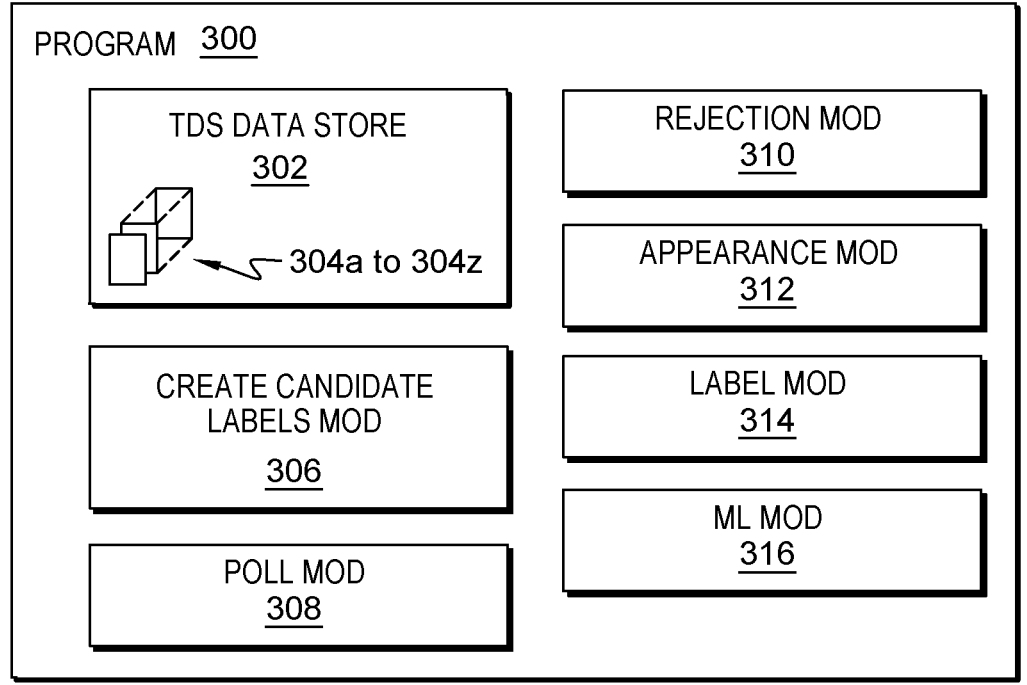
FIG. 3 is a block diagram showing a machine logic (for example, software) portion of the first embodiment system.

As shown in FIG. 1, networked computer system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where training data set data store 302 receives training data sets 304*a* to 304*z* through communication network 114 from client subsystem 104. In this example the training data sets (TDSs) are received in an unlabeled state for the purpose of having correct labels (sometimes herein referred to as "optimal labels") respectively added to the data sets as metadata. Alternatively, and as will be further discussed below, in other embodiments the training data sets already have labels and are being checked to determine whether any of the labels are incorrect.

Figure 4:
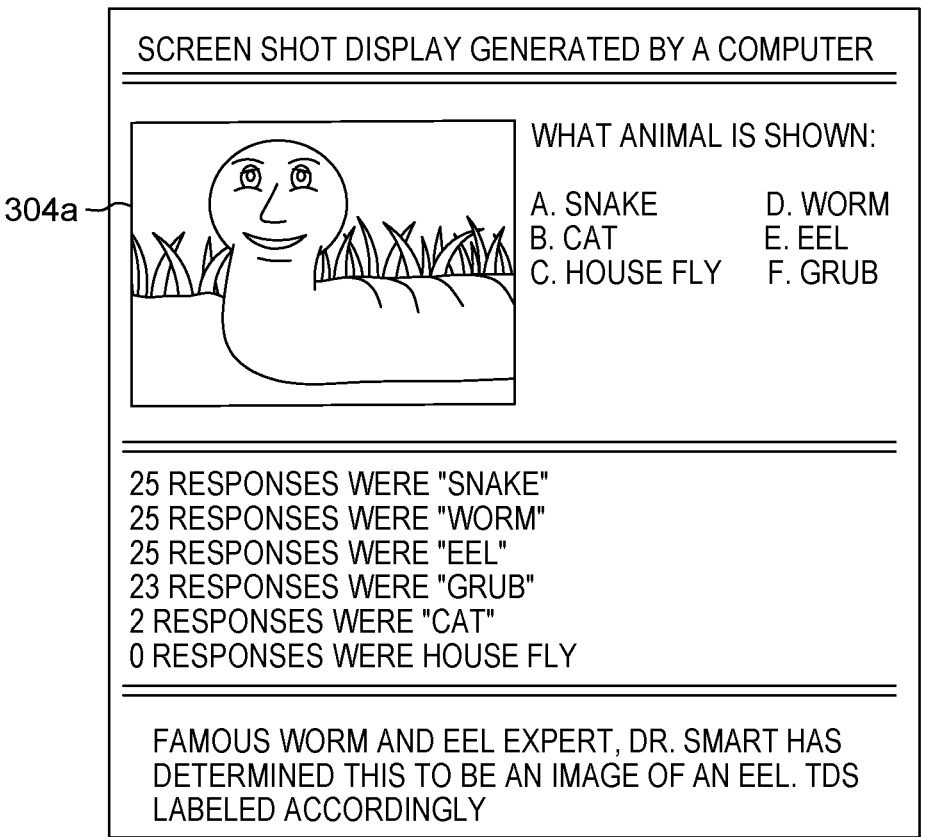
FIG. 4 is a screenshot view generated by the first embodiment system.

In this example, TDSs 304*a* to 304*z* have been subject to some pre-screening so that it is known with a decent level of confidence that each TDS includes substantive data in the form of a graphic image of one of the following six (6) animals: (A) snake; (B) cat; (C) house fly; (D) worm; (E) eel; and (F) grub. This is shown in the topmost section of screenshot 400 of FIG. 4. Alternatively, a TDS may contain other kinds of substantive data that is subject to labeling and/or relabeling. As may be discussed in the following subsection of this Detailed Description section, some embodiments of the present invention may be applied to selecting the best answers for other types of questions that are not related to training data sets for machine learning.

Processing proceeds to operation S260, where create candidate labels module ("mod") 306 creates a list of candidate labels. These candidate labels should encompass at least most of the subject matter of the TDSs that need labeling or re-labeling. In this example, the creation of the candidate labels is performed with the assistance of a human programmer (not separately shown in the Figures). In this example, there are 6 candidate labels as follows: (A) snake; (B) cat; (C) house fly; (D) worm; (E) eel; and (F) grub.

Processing proceeds to operation S265, where poll mod 308 polls a set of 100 human nonexpert annotators to determine what each annotator believes to be the correct description of the image of each TDS 304*a* to 304*z*. Not all of the devices used by these human nonexpert annotators are shown in FIG. 1, but client subsystems 106, 108, 110 and 112 represent four of these human nonexpert annotators. In this example, the human nonexpert annotators are presented with all six of the candidate labels (see top section of screenshot 400). Alternatively, nonexpert annotators may be presented with less than all of the possible candidate labels. In this example, the human nonexpert annotators must select a single label from among the candidate labels. Alternatively, some embodiments may allow annotators to make multiple choices from among and between the candidate labels. As will be seen in some of the following operations, the focus here is more on what labels the annotators do not choose, or choose relatively infrequently, rather than the labels that the evaluators actually choose.

As shown in the middle section of screenshot 400, for the image of TDS 304*a*: (i) 25 evaluators chose the snake option; (ii) 25 evaluators chose the worm option; (iii) 25 evaluators chose the eel option; (iv) 23 evaluators chose the grub option; (v) two (2) evaluators chose the cat option; and (vi) no evaluators chose the house fly option. In other words, both the grub option and the cat option were chosen relatively infrequently.

Processing proceeds to operation S270, where rejection mod 310 determines that the grub label and the cat label are rejected based upon the relative infrequency with which those two (2) labels were chosen. Generally speaking, relative infrequency is measured by whether the infrequency falls below, or above, some predetermined numerical threshold. It may be a relative threshold (that is, an option is chosen by less than X percent of the respondent evaluators) or an absolute threshold (that is, an option is chosen by less than N respondent evaluators). In this example, there is an absolute threshold of 5, which means that any option that garners fewer than five (5) responses, out of the 100 responses received from nonexpert evaluators, is considered to be rejected. Accordingly, in this example, the candidate labels that will be culled are as follows: cat and house fly. It is believed that, for at least some applications, focusing on the responses that were not chosen, rather than focusing on responses that were chosen, may lead to more meaningful information about the optimal answers, especially in the domain of human nonexpert annotators.

Processing proceeds to operation S275, where acceptance mod 312 determines an accepted subset of candidate labels. In this example, the accepted subset of candidate labels includes 4 candidate labels as follows: worm, grub, eel and the snake. As those of skill in the art will appreciate, the labels which are determined to be rejected effectively define the subset of candidate labels that is determined to be accepted, which is to say that the candidate labels not subject to being culled out at the previous operation are the accepted candidate labels.

Processing proceeds to operation S280, where acceptance mod 312 outputs the accepted subset of candidate labels for further processing by a human or by some type of software algorithm. In this example, the accepted subset of candidate labels are sent through communication network 114 to client subsystem 112 which is used by a human expert. Because of the selective culling of the rejected labels, the human expert has fewer candidate labels to concern herself with when labelling. This can save time and or increase the accuracy of the results from the expert.

As shown in the bottom section of screenshot 400, the expert in this example is Dr. Smart who has determined that the optimal label for the image of TDS 304*a* is "eel." Alternatively, multiple experts may be consulted. Alternatively, there may be several iterative rounds of sending progressively culled sets of candidate labels to sets of experts and/or nonexperts. It is also noted that, in this example, the calling of the rejected candidate labels helps determine to which expert the accepted subset of candidate labels is sent. Dr. Smart is an expert on worms and eels which were two (2) of the choices prominently present in the accepted subset of candidate labels. If the cat and housefly candidate labels had not been culled out by the polling of the nonexperts, then acceptance mod 312 might have sent the accepted subset of candidate labels to Dr. Respected, instead of Dr. Smart, because Dr. Respected, is an expert on cats and house flies.

Processing proceeds to operation S285, where label mod 314 applies the selected, optimal label as metadata to the corresponding TDS (for example, TBS 304a is now labeled as an image of an eel).

Processing proceeds to operation S290, where machine learning (ML) mod 316 applies the labeled training data sets 304a to 304z to help train a machine learning algorithm by supervised learning.

III. FURTHER COMMENTS AND/OR EMBODIMENTS

Some embodiments of the present invention recognize one, or more, of the following facts, potential problems and/or potential areas for improvement with respect to the current state of the art: (i) many machine learning methods require high quality labeled data, which are expensive to curate; (ii) machine learning methods often require expert skills and large amount of working time; (iii) using the crowd to perform a task is cheap, but often not accurate; (iv) crowd accuracy needs to be improved to be compatible with experts (which experts are typically expensive); (v) it would be potentially advantageous to reduce workload on experts and time investment needed from experts; (vi) solutions may consider task dependency; and/or (vii) solutions may consider strategies that can be applied generally and/or in several contexts.

To help illustrate some of the items of the list in the previous paragraph, an example scenario will now be discussed. Semantic role labeling (SRL) is a critical task in natural language processing. Unfortunately, the wide adoption of SRL systems has been long hindered by the limited availability of large-scale, gold-labeled data. Recent crowdsourcing work has shown great promise in SRL data generation, by automatically distributing suitable tasks to a combination of crowds and experts as annotators who curate SRL system outputs. However, significant expert involvement (34%) is still required with little understanding of the factors affecting crowd workers' curation performance.

Some embodiments of the present invention recognize one, or more, of the following facts, potential problems and/or potential areas for improvement with respect to the current state of the art: (i) the wide adoption of SRL systems has long been an open challenge particularly due to the lack of large-scale, accurately labelled training data across domains; (ii) collecting such data has required trained experts and extensive annotation guidelines, making the process prohibitively expensive and slow; (iii) crowdsourcing has shown its effectiveness in many NLP tasks, such as paraphrasing, dialog generation, and language translation; (iv) prior attempts to crowdsource SRL annotations have all reported only moderate results showing the difficulty of generating high-quality SRL data via non-experts alone; and (v) automatically distributing tasks to a combination of crowd workers and experts according to their difficulty levels has been shown to be effective, but experts are still required for a significant subset of tasks.

Some embodiments of the present invention may include one, or more, of the following operations, features, characteristics and/or advantages: (i) improves crowdsourcing accuracy and achieves expert-quality results; (ii) improves accuracy of tasks performed by non-expert workers; (iii) reduces the load of expert workers; and/or (iv) unlike currently conventional crowdsourcing techniques which require workers to select the right answer from a given list (set) of options, in some embodiments of the present invention, non-experts workers focus their efforts on identifying options that are highly-likely to be wrong.

An embodiment of a method according to the present invention includes three (3) phases as follows: (a) first, a filtering phase, that reduces the number of original list of options by assigning non-expert workers the task of identifying those that are highly-likely to be wrong; (b) second, a comparison phase, where workers select the most likely answer from the filtered set of candidate answers; and (c) third, expert phase, where expert workers are asked to select the right answer. In phase (a), once likely-wrong answers are identified, they are eliminated, and a new subset of the original options is defined as the working list for the subsequent steps. This process can be performed recursively on the remaining candidate answers until a specific target is reached. Sample reduction criteria are percentage reduction, removal of a specific number N (or up to N) options, elimination of all but M, etc. In phase (b), majority voting can be used to determine best answer and to identify more difficult cases for the next phase. In phase (c), the work is helped by the output of previous steps, where candidate answers can be sorted by results of filtering step.

Some embodiments of the present invention may include one, or more, of the following operations, features, characteristics and/or advantages: (i) a strategy to define reduction criteria and/or number of iterations and/or majority threshold through experiments; (ii) strategic assignment of tasks to workers; (iii) build workers reputation or identify correlations to be used on the next crowdsourcing as input to criteria to assign tasks to non-expert workers (instead of random assignments); (iv) use such information to refine the parameters in the workflow; (v) for example, depending on the worker's quality, some workers are more suitable for the filtering phase, while others are more suitable for the comparison phase; (vi) as another example, depending on reliability of workers, some can safely remove half of the unlikely options, others can only safely remove 30% in each round (percentage varies according to worker reputation); and/or (vii) different worker quality can require different majority criteria in the comparison phase.

An embodiment of a method for selecting an optimal answer from a set of candidate answers by human non-expert and expert annotators, includes the following operations: (i) filtering operation, in which the human annotators filter out the most unlikely answers (if only a single answer remains, stop and output it as the chosen answer, but otherwise continue to the next operation on this list); (ii) election operation, in which human annotators identify the most likely correct answer from the remaining answers (with option to decide a case to be difficult/unsure—if the case is not difficult/unsure and an answer is chosen, stop and output the chosen answer, but otherwise continue to the next operation on this list); and (iii) expert step, in which expert annotators identify the most likely correct answer.

Some embodiments of the present invention may include one, or more, of the following operations, features, characteristics and/or advantages: (i) iteratively performing the filtering to remove at least one answer with each iteration, until no more than a predetermined number of candidate answers remain; (ii) the filtering operation may include voting by a crowd of annotators, so that only answers deemed unlikely by a proportion of annotators will be removed; (iii) the election operation may include voting by a crowd of annotators, so that only answers deemed correct by a proportion of human annotators will be chosen; (iv) the election operation may include receiving, from one or more annotators, indications of uncertainty or difficulty of a case, and responsively accepting a chosen answer if the case is not deemed too difficult by a proportion of the annotators; (v) the expert analysis operation may include showing, to a set of expert annotator(s), the subset of original possible answers developed by the filtering operation and/or the election operation; (vi) the multiple cases can be farmed out to a crowd of annotators simultaneously, each annotator potentially working on multiple cases; (vii) some embodiments of the present invention may be applied to labeling tasks where one of a multiple candidate labels is to be selected; (viii) some labeling-task embodiments of the present invention may be applied to the tasks of semantic role labels, where the task is to identify the correct label for a predicate sense, or the correct label for an argument role; and/or (ix) some embodiments may be considered, in some sense, the inverse of ranked choice voting (that is, state dislikes instead of preferences).

Some embodiments of the present invention may include one, or more, of the following operations, features, characteristics and/or advantages: (i) changes the tasks for the crowd to increase accuracy of non-experts so that less work is typically routed to experts; (ii) uses non-experts to shorten possible answers so the work routed to experts becomes easier for them to perform; (iii) increases the accuracy of a crowdsourced crowd worker by asking the crowd worker to filter out potential answers (as opposed to filtering crowd workers, which would be a different thing altogether); (iv) redefines the goal of the worker independent of the target audience; (v) requests workers to eliminate unlikely answers; (vi) changes the workflow of crowd workers to make them more accurate; (vii) technology for addressing two aspects of the problem simultaneously as follows: (a) reduce expert workload, and (b) provide high quality results from a crowdsourced crowd, or they provide high quality result, but still require expert work on large proportion of cases; (viii) uses non-experts to identify a subset of choices that are highly unlikely to be correct; (ix) leverages knowledge/work of other workers to be used by works at the time of performing their work; and/or (x) sets a threshold that can do both of the following: (a) achieve high accuracy from non-expert workers, and (b) keep low workload for experts.

In many applications, the labeling task consists of an (often large) number of cases, and for each case one label must be selected out of a given set of labels. The crowd worker often have difficulty selecting the most appropriate label, hence their lower perform than experts or even machine results. This is especially so for the cases with large number of candidate labels. On the other hand, they often can reliably identify the top few choices among all the options that include the correct answer. For cases with small number of candidates, the crowd can often select the correct answer with high precision. Some embodiments of the present invention may restructure the crowdsourcing workflow to better use the aspects of the crowd with higher precision.

An example, involving choosing multiple labels will now be discussed. In this example, the workflow includes the following phases: (1) Filter: the crowd filter out the unlikely labels; (2) Compare: the crowd workers choose labels from the remaining labels; and (3) Fix: the difficult cases are passed to the experts, with additional information from the previous steps. For example, the candidate answers already eliminated by the crowd in the Filter phase can be shown to experts as the complete universe of possible answers.

Some embodiments of the present invention may include one, or more, of the following operations, features, characteristics and/or advantages: (i) the crowd performance in the Filter phase has high precision; (ii) with reduced set of candidate labels, the crowd performance in the Compare phase also increases substantially, compared with performing selection from all original candidate labels; (iii) the Filter and Compare phases can solve a large proportion of the cases, as well as identifying difficult cases more appropriate to expert with high precision; (iv) the overall system output has high precision; (v) expert only need to work on small set of cases; (vi) experts work cases benefit from helpful information from the crowd; (vii) the accuracy of the crowd to eliminate unlikely answer is very high; (viii) hence, when they unanimously agree to eliminate an answer, there is high probability their decision is correct; and/or (ix) recognizes errors in existing gold standard labels by a crowd of non-experts.

Some embodiments of the present invention may include one, or more, of the following operations, features, characteristics and/or advantages: (i) method that improves crowdsourcing accuracy and achieves expert-quality results; (ii) method that improves accuracy of tasks performed by non-expert workers and reduces the load of expert workers; and/or (iii) a method where non-experts workers focus their efforts on identifying options that are highly-likely to be wrong (as opposed to traditional crowdsourcing which requires workers to select the right answer from a given list (set) of options).

An embodiment of a method according to the present invention includes the following operations: (i) a filtering operation; (ii) a comparison operation; and (iii) an expert analysis operation. These three (3) operations will be respectively discussed in the following three (3) paragraphs.

The filtering operation includes the following sub-operations: (a) reduces the number of original list of options by assigning non-expert workers the task of identifying those that are highly-likely to be wrong, (b) once identified, they are eliminated, and (c) new subset of the original options is defined as the working list for the subsequent steps. This process can be performed recursively on the remaining candidate answers until a specific target is reached. Sample reduction criteria are percentage reduction, removal of a specific number N (or up to N) options, elimination of all but M, etc.

In the comparison operation, crowd workers select the most likely answer from the filtered set of candidate answers. In some embodiments, majority voting is used to determine best answer and to identify more difficult cases for the next phase.

The expert analysis operation, expert workers are asked to select the right answer. Their work is helped by the output of previous steps, where candidate answers can be sorted by results of the filtering step.

Strategic assignment of tasks to workers will now be discussed. Some embodiments may include building workers' reputations or identifying correlations to be used on the next crowdsourcing as input to criteria to assign tasks to non-expert workers (instead of random assignments). In some embodiments, such information is used to refine the parameters in the workflow. For example, depending on the worker's quality, some workers are more suitable for the filtering phase, while others are more suitable for the comparison phase. As another example, depending on reliability of workers, some can safely remove half of the unlikely options, others can only safely remove 30% in each round (percentage vary according to worker reputation). Different worker quality can require different majority criteria in the comparison phase.

Some embodiments of the present invention may include one or more of the following operations, features, characteristics and/or advantages: (i) providing advantages in the domain of crowd sourcing for semantic role labeling and other tasks where there is no direct scoring of the answers, other than the answers themselves provided by the crowd; (ii) constructing an efficient workflow to utilize the crowd to provide expert quality results; (iii) collecting gold standard labels that are not about individual user experience; (iv) using the crowd to provide direct answers to the labeling questions; (v) constructing crowd workflow so that the crowd answers have quality comparable to experts; (vi) tasks such as semantic role labeling direction answers from crowd sourcing produces systematic errors even for large crowd; (vii) asking workers first to filter out answers unlikely to be correct, and then selecting from the remaining; (viii) increaseing the quality by asking the crowd workers to first conduct the filtering step, which they can perform with high quality; and/or (ix) does not depend on existence of external knowledge, structured or not, but rather depends on the crowd.

Some embodiments of the present invention may include one or more of the following operations, features, characteristics and/or advantages: (i) achieving expert-level annotation quality for semantic role labeling via crowdsourcing; (ii) significantly lowering the cost of collecting gold-labeled semantic role labeling (SRL) data; (iii) involving workflow and task design decisions for SRL classifier output curation via crowdsourcing and experts; (iv) focusing on two closely related subtasks: (a) disambiguating predicate senses regarding Propbank frames given the sentence context, and (b) assigning semantic roles invoked by the predicate frames to arguments; (v) Semantic Role Labeling System with Mixed Expertise (SRLSM), which is pronounced "surrealism", and which is a crowdexpert annotation system that iteratively evaluates and improves state-of-the-art SRL classifier outputs; (vi) providing a technical contribution of SRLSM via a data annotation pattern called Filter-Compare-Fix; and/or (vii) maximizing annotation quality while minimizing expert involvement.

Figure 5:
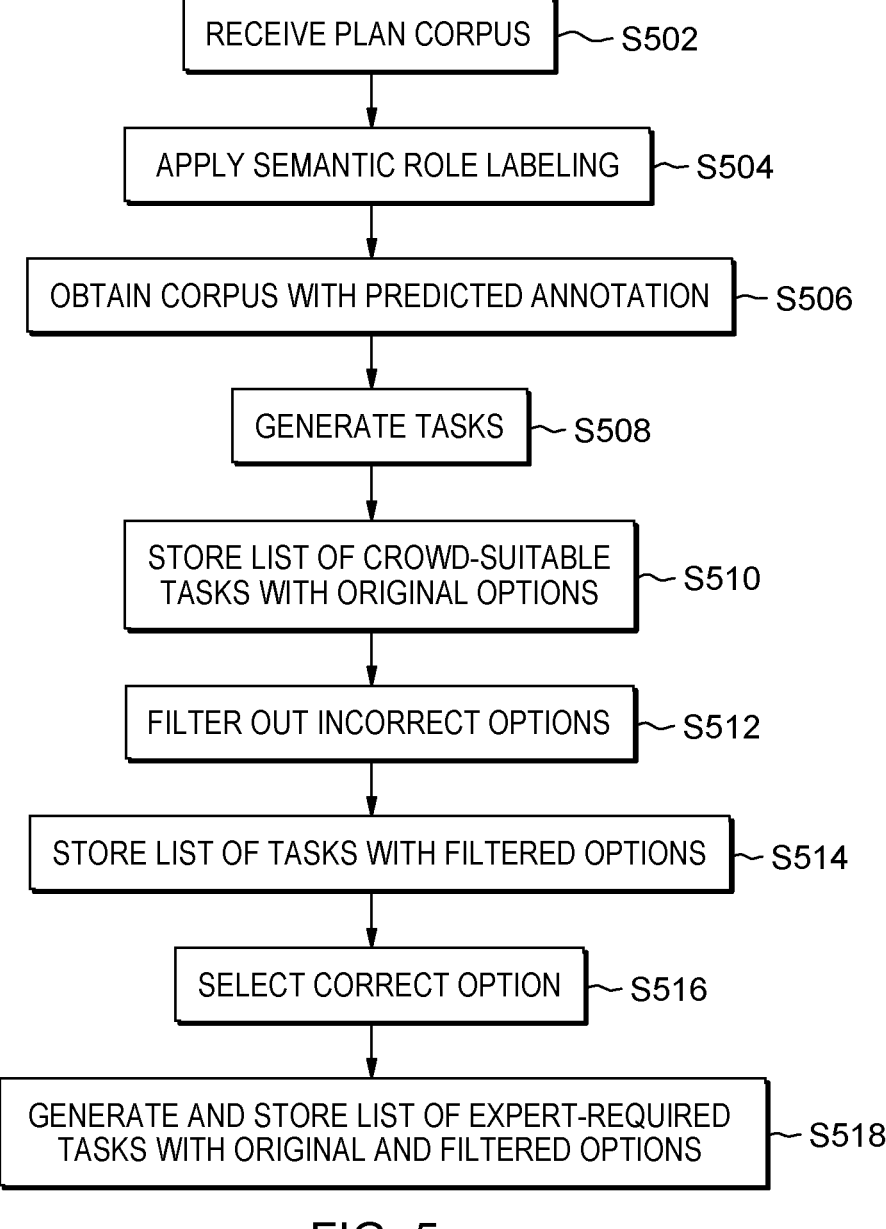
FIG. 5 is a flowchart showing a second embodiment of a method according to the present invention.

As shown in the flowchart of FIG. 5, an embodiment of a method that employs the Filter-Compare-Fix approach for SRL classifier output curation includes the following operations: S502; S504; S506; S508; S510; S512; S514; S516; and S518. Each of these operations will respectively be explained in the following nine (9) paragraphs.

At operation S502 a plain corpus is received. As those of skill in the art will appreciate, there is no need to discuss code for this operation in detail. A plain corpus is basically a set of natural language sentences.

At operation S504 semantic role labelling (SRL) is applied. As those of skill in the art will appreciate, there is no need to discuss code for this operation in detail. The SRL here can be any version of SRL (now known or to be developed in the future).

At operation S506 an annotated corpus is received as an output from previous operation S504. The annotations are predicted annotations, which means that the results are produced by SRL. An example of text of a representative predicted annotation is as follows: (i) the input text is "teacups were sold by the giraffe"; and (ii) the annotation produced is as follows: "A0=seller (agent), A1=thing sold (patient), A2=buyer (recipient) and A3=price paid."

At operation S508, tasks are generated. These "tasks" are data sets that require some type of tagging or other identification so that the data sets can be utilized for machine learning training purposes. In the extended example of the previous sub-section of this detailed description section, the task was a data set corresponding to an image of an undetermined animal that needed to be identified from the visual features of the image. Some different possible types of tasks, to which various embodiments of the present invention may be applied, include: image/video identification; text recognition; text meaning; interpretation of medical data (for example, spotting broken bones in x-ray images); shallow semantic parsing; text entailment; question answering; machine translation and/or information extraction.

At operation S510, a list of tasks, suitable for crowd-sourcing to eliminate answers, is stored along with original options. The list of tasks is the set of datasets that are to be identified/explained by a combination of crowdsourcing (first in time) and then expert analysis (second in time). The original options reflect the universe of possible answers that are to be presented to crowdsource style participants in a first round of "crowdsource answer elimination."

At operation S512, the tasks, along with the original options, are sent to various non-expert crowdsource participants to eliminate one, or more, of the incorrect options from the original list of options. This will save work for crowd-source participants in later rounds of questioning and/or for experts used to make the final determination on how each data set is identified so that it can be used for training purposes in future machine learning (ML) schemes. For some data sets to be identified, the filtering of operation S512 will leave only one answer, which means that the data set has been positively identified with some level of confidence by the first round of crowdsource questioning. For example, this round might resolve, and effectively label, 26% of the original tasks, meaning that only 74% would require further rounds of non-expert crowdsourcing and/or expert examination.

At operation S514, the list of tasks is stored, but with a reduced set of options by virtue of the fact that some options were eliminated in the first round of crowdsource questioning at operation S512.

At operation S516, all remaining options are provided to the workers who will then select a correct option from them. For some data sets to be identified, the filtering of operation S516 will leave only one answer, which means that the data set has been positively identified with some level of confidence by the second round of crowdsource questioning. For example, this round might resolve, and effectively label, 61% of the original tasks, meaning that only 13% would still require the expert examination of operation S518.

At operation S518, a list of tasks that will require expert input is generated and stored. This list includes both the original options and the options that remain after the filtering of operations S512 and/or S516. The experts are receiving the original options because, for difficult cases, the workers may have removed the wrong options. Some embodiments will highlight the ones chosen by the crowd along with all other options, so that the work done by the crowd is still taken into consideration.

As shown in flow chart of FIG. 5, crowd workers are recruited to filter out incorrect options (Filter step, see operation S512) and to select the correct option by comparing examples (Compare step, see operation S516). Tasks that crowd workers are not confident in will be sent to experts (Fix step, see operation S518) In some embodiments, SRLSM generates SRL annotations with very high correctness (95%) while sending only 13% of tasks to experts. Moreover, some embodiments also identify previously undiscovered incorrect "gold" annotations (3%) that existed in a certain database of training data sets. As those of skill in the art will understand, gold annotations are typically considered to be highly reliable and not subject to much error.

Some embodiments may involve analysis of workflow and task design options affecting crowd-expert curation of SRL classifier outputs, including expert involvement ratio, filtering out incorrect options, and notifying when workers' answers are different from the classifiers.

Filter-Compare-Fix is an approach that: (i) achieves expert-level annotation correctness for most SRL tasks via crowdsourcing; and (ii) identifies a small set of tasks that require expert efforts. This approach significantly reduces expert involvement compared to the baseline, while maintaining very high annotation correctness. An embodiment of a system (SRLSM) that instantiates the Filter-Fix-Compare approach to significantly improve the proportion of correct annotations of state-of-the-art SRL classifier outputs (this is sometimes referred to herein as "correctness"), along with the evaluation results. Evaluation and discussion of reasons from three linguistics experts for the incorrect gold standard annotations identified by SRLSM.

The crowdsourcing techniques for SRL, disclosed herein, are related to previous work in crowdsourcing for: (i) predicate annotation; (ii) argument annotation; and (iii) human-in-the-loop methods. These three (3) crowdsourcing methods will be respectively discussed in the following three (3) paragraphs.

In the context of crowdsourcing for predicate annotation, the first step of SRL annotation is to identify predicates and their senses from sentences. Predicate identification is usually performed by automated systems, and the corresponding sense selection refers to the word sense disambiguation (WSD) task. The most common task design for crowdsourcing WSD is to select the correct word sense from a list of options. Other designs include categorizing sentences according to senses of the words they contain, or rewarding workers by assigning scores based on their agreement with other workers.

In the context of crowdsourcing for argument annotation, in some crowdsourcing argument annotation techniques all candidate roles are given for each task. In other known techniques for crowdsourcing for argument annotation, there is machine logic that performs the operation of selecting the candidate argument for each role across all candidate frames and/or marking arguments in sentences. In other computer systems for performing crowdsourcing for argument annotation, machine logic is programmed to convert argument annotation into question-answering tasks (QA-SRL) by collecting 5W1H questions (that is, who, what, where when, why and how type questions) and their answers.

Some known human-in-the-loop methods will now be discussed. Human-in-the-loop methods leverage human and machine intelligence to complete tasks with performance that neither can achieve alone, like machine translation, dialog system development, and semantic parsing. Recently, active learning has been integrated into the methods to collect real-time human inputs and train systems on cases they are uncertain. However, there has been limited analysis on understanding and fixing errors generated by those systems.

In some embodiments of the present invention, crowdsourced troubleshooting for a traditionally expert-required task is performed (for example, SRL annotation), and reported as an analysis (in human understandable form and format) of workflow and task design options affecting crowd performance.

Some embodiments of SRLSM systems according to the present invention may: (i) include a data annotation system involving a state-of-the-art NLP classifier, crowd workers, and experts; (ii) be configured to achieve a design goal of enabling crowd workers to reach expert-level annotation quality for a majority of tasks, thus reducing the expert workload when curating outputs of state-of-the-art SRL classifiers; (iii) SRLSM that achieves high correctness with significantly fewer tasks being sent to experts than the expert-baseline, thereby decreasing the expert workload; (iv) shows the efficiency of SRLSM by reducing the cost of generating accurately-labeled data; and/or (v) implement expert-level annotation quality was achieved by crowd workers through filtering and notifications; and/or (vi) include human-in-the-loop systems that can generate large, high-quality SRL datasets at low cost.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

receiving, by a device operatively coupled to a processor, a training data set through an online communication network from a client subsystem of a plurality of candidate subsystems, wherein the training data sets comprise image data;

filtering out, by the device, one or more rejected candidate labels from a plurality of candidate labels based upon receipt of electronic information transmitted over a computer network from one or more disparate locations and indicative of the one or more rejected candidate labels being chosen less than a defined frequency as a correct label by a plurality of nonexpert annotators, wherein the filtering out results in a reduced subset of candidate labels;

output, from the device, to an expert annotator external to the device, one or more polls to determine what each expert annotator believes to be the correct description of the image of each of the training data sets;

receiving, by the device, feedback from outside of the device, of one or more responses from the one or more polls determining what each expert annotator believes to be the correct description of the image of each of the training data sets;

selecting, by the device, from the reduced subset of candidate labels, between a plurality of optimal labels based upon the one or more responses received from at least one expert annotator of a plurality of expert annotators, wherein each expert annotator of the plurality of expert annotators has an expertise level above a defined expert value;

adding, by the device, as metadata, an optimal label of the plurality of optimal labels, to the training data set;

selecting, by the device, a one of the plurality of candidate subsystems to which to transmit, over the communication network, the optimal label, wherein the selection is based on an expertise of the plurality of expert annotators and subject matter of the optimal label;

transmitting, by the device, over the communication network, to a selected one of the plurality of candidate subsystems, the optimal label, wherein the selected one of the plurality of candidate subsystems; and applying, by the device, labeled training data sets to the training data sets; and training, by the device, a machine learning algorithm, employing supervised learning, based on applying the labeled training data sets.

2. The computer-implemented method of claim 1, wherein the selecting the optimal answer comprises:

exposing the reduced subset of candidate labels to at least one of the expert annotators; and receiving, from at least one of the expert annotators, and identification of the optimal label from the reduced subset of candidate labels.

3. The computer-implemented method of claim 1, wherein the filtering out is iteratively performed at least twice, and wherein each iteration of the filtering removes at least one candidate label from the reduced subset of candidate labels.

4. The computer-implemented method of claim 1, wherein the filtering out is iteratively performed until only a single label remains in the reduced subset of candidate labels.

5. The computer-implemented method of claim 1, wherein the filtering out comprises electronically voting, on an electronic device displaying the plurality of labels, by a crowd of the nonexpert annotators from the one or more disparate locations over the computer network, which comprise at least a portion of the plurality of nonexpert annotators, so that only labels deemed unlikely by a defined proportion of the nonexpert annotators are removed to obtain the reduced subset of candidate labels.

6. The computer-implemented method of claim 1, wherein the selecting comprises electronically voting by a crowd of nonexpert annotators, in response to a computer poll sent over a computer network to respective electronic devices associated with the crowd of nonexpert annotators, wherein the crowd of nonexpert annotators comprise at least a portion of the plurality of nonexpert annotators, so that a candidate answer, of the reduced subset of candidate labels, deemed correct by a defined proportion of the plurality of nonexpert annotators are selected as the optimal label.

7. The computer-implemented method of claim 1, further comprising:

receiving, by the device, from the plurality of nonexpert annotators, an indication of a relative level of uncertainty or difficulty of choosing a label;

determining, by the device, whether the selection of candidate labels is too difficult for the plurality of nonexpert annotators, wherein the determining is based upon the indication of the relative level of uncertainty or difficulty being greater than a defined uncertainty or difficulty threshold value; and responsive to the determining that the selection of candidate labels is too difficult for the plurality of nonexpert annotators, communicating, by the device, an entirety of the plurality of candidate labels to at least one of the plurality of-expert annotators.

8. The computer-implemented method of claim 1, further comprising:

applying, by the device, the optimal label as metadata for use in semantic role labeling, wherein a task is to identify a correct label for a predicate, or a correct label for an argument role.

\* \* \* \* \*